(12) United States Patent
Babbitt et al.

(10) Patent No.: US 12,140,163 B2
(45) Date of Patent: *Nov. 12, 2024

(54) HYDRAULIC BRAKING ENERGY UTILIZATION FOR EMERGENCY STEERING, BRAKING, CHARGING ACCUMULATOR(S), AND/OR WORK FUNCTIONS TO REDUCE OR PREVENT ENGINE FROM OVERSPEED, ASSIST ACCELERATION AND/OR UNLIMITED TOWING

(71) Applicant: Applied Industrial Technologies, Inc., Cleveland, OH (US)

(72) Inventors: Wenling Babbitt, San Diego, CA (US); W. E. Hoffner, III, Cleveland, OH (US)

(73) Assignee: Applied Industrial Technologies, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,647

(22) Filed: May 17, 2023

(65) Prior Publication Data
US 2023/0287907 A1 Sep. 14, 2023

Related U.S. Application Data

(63) Continuation of application No. 17/350,799, filed on Jun. 17, 2021, now Pat. No. 11,674,532, which is a
(Continued)

(51) Int. Cl.
*F16H 61/4157* (2010.01)
*B60T 13/14* (2006.01)
(Continued)

(52) U.S. Cl.
CPC ............ *F15B 11/08* (2013.01); *B60T 13/141* (2013.01); *B62D 5/30* (2013.01); *F15B 1/022* (2013.01);
(Continued)

(58) Field of Classification Search
CPC ............. F16H 61/4078; F16H 61/4096; F16H 61/4157; F16H 61/4165
See application file for complete search history.

(56) References Cited

U.S. PATENT DOCUMENTS 4,087,969 A * 5/1978 Takahashi .............. B62D 11/18
60/464
4,505,355 A * 3/1985 Scheurenberg ......... B60T 13/22
180/307
(Continued)

FOREIGN PATENT DOCUMENTS

DE 102009058005 A1 * 6/2011 ......... F16H 61/4096

OTHER PUBLICATIONS

DE102009058005A1_t machine translation thereof (Year: 2011).*

*Primary Examiner* — Kenneth Bomberg
*Assistant Examiner* — Matthew Wiblin
(74) *Attorney, Agent, or Firm* — UB Greensfelder LLP; Brian E. Turung

(57) ABSTRACT

A system and method configured to direct the braking energy from a high-pressure port at the motor side of a hydraulic circuit to emergency steering, braking, accumulator(s) charging, and/or various work functions. The system and method are also configured to return hydraulic fluid back to the same high-pressure port when the motor is running as a pump.

7 Claims, 9 Drawing Sheets

Related U.S. Application Data continuation of application No. 16/184,195, filed on Nov. 8, 2018, now Pat. No. 11,156,237.

(60) Provisional application No. 62/583,298, filed on Nov. 8, 2017.

(51) Int. Cl.
    *B62D 5/30*         (2006.01)
    *F15B 1/02*         (2006.01)
    *F15B 11/08*       (2006.01)
    *F16H 61/4096*    (2010.01)
    *F16H 61/4165*    (2010.01)

(52) U.S. Cl.
    CPC ..... *F16H 61/4096* (2013.01); *F16H 61/4157* (2013.01); *F16H 61/4165* (2013.01); *B60T 2270/402* (2013.01); *F15B 2211/205* (2013.01); *F15B 2211/4053* (2013.01); *F15B 2211/625* (2013.01); *F15B 2211/6355* (2013.01); *F15B 2211/85* (2013.01); *F15B 2211/8752* (2013.01)

(56) References Cited

U.S. PATENT DOCUMENTS

| | | | | |
|---|---|---|---|---|
| 9,103,359 | B2 * | 8/2015 | Mochizuki | F15B 21/00 |
| 2010/0186408 | A1 * | 7/2010 | Rose | F02N 7/00 |
| | | | | 60/629 |
| 2010/0287922 | A1 * | 11/2010 | Rosman | B60K 6/12 |
| | | | | 60/327 |
| 2011/0036651 | A1 * | 2/2011 | Majkrzak | F16H 61/4078 |
| | | | | 180/53.4 |
| 2012/0304631 | A1 * | 12/2012 | Nelson | F16H 61/4096 |
| | | | | 60/327 |
| 2017/0227024 | A1 * | 8/2017 | Masters | E02F 9/2292 |

* cited by examiner

Hydrostatic Propulsion System ← 600

HYDRAULIC BRAKING ENERGY UTILIZATION FOR EMERGENCY STEERING, BRAKING, CHARGING ACCUMULATOR(S), AND/OR WORK FUNCTIONS TO REDUCE OR PREVENT ENGINE FROM OVERSPEED, ASSIST ACCELERATION AND/OR UNLIMITED TOWING

CROSS REFERENCE TO RELATED APPLICATIONS

The present invention is a continuation of U.S. application Ser. No. 17/350,799 filed Jun. 17, 2021, which in turn is a continuation of U.S. application Ser. No. 16/184,195 filed Nov. 8, 2018, which in turn claims priority on U.S. Application Ser. No. 62/583,298 filed Nov. 8, 2017, which are incorporated herein by reference.

The present disclosure is directed to a system and method configured to direct the braking energy from a high-pressure port at a propulsion motor side of a hydraulic circuit/system and to at least partially use such energy for (a) emergency steering and braking; (b) input into accumulator(s); and/or, (c) various other work functions. Moreover, the system and method of the present disclosure is configured to return hydraulic fluid (e.g., hydraulic fluid, etc.) back to the same port at the propulsion pump side when the motor is running as a pump. The motor may run as a pump, for example: (1) when the engine dies at high machine velocity on flat ground; (2) when the engine dies while the machine travels downhill; (3) during machine deceleration; and/or, (4) when the machine is being towed.

BACKGROUND

Systems and methods for controlling speed and braking in vehicles having hydrostatic drives are known in the art. During braking in some known hydrostatic drives, an associated motor gathers the vehicle's momentum and runs as a pump, while an associated pump runs as a motor. The input torque from the pump transfers to the vehicle's engine and can cause overspeed due to insufficient engine braking power. The more input torque, the more engine overspeed, and/or excessive overspeed can result in damage to the engine and the pump.

During braking in other known hydrostatic drives, a speed limiter circuit is utilized which converts excessive hydrostatic power to heat through a pressure-reducing valve. The heat energy is then dissipated to the ambient environment through the transmission housing or via an associated hydraulic fluid cooler. While this approach provides engine overspeed protection to a certain level, the heat energy dissipated to the ambient environment reduces overall system performance and efficiency. Examples of prior art speed control and hydrostatic drives are disclosed in U.S. Pat. Nos. 9,512,918 and 7,874,153, which are incorporated herein by reference.

Systems and methods for overcoming these prior art deficiencies related to speed and braking control in vehicles having hydrostatic drives are needed.

BRIEF DESCRIPTION

Non-limiting aspects of the present disclosure include a system and method configured to direct the braking energy in a propulsion circuit of a machine. More particularly, the braking energy is directed from a high-pressure port at the propulsion motor side of the circuit to be used in: (a) an emergency steering and braking circuit; (b) one or more accumulators; and/or (c) any other work functions performed by common components in machines which utilize propulsion circuits.

Moreover, in accordance with other non-limiting aspects of the present disclosure, the exemplary system and method are configured to return hydraulic fluid back to the same high-pressure port at the propulsion pump side when the motor is running as a pump. This may occur, for example, when: (1) the engine dies at high machine velocity on flat ground; (2) the engine dies while the machine is undergoing downhill travel; (3) the machine is decelerating; (4) the machine is being towed; and/or, (5) any other time the propulsion motor is being driven as a pump. Thus, the system and method of the present disclosure advantageously utilize braking energy to overcome the aforementioned deficiencies of the prior art.

In some non-limiting embodiments, braking energy can first be utilized for emergency steering and braking operations. In other non-limiting embodiments, braking energy can also or alternatively be stored in accumulators for later use. In additional non-limiting embodiments, braking energy can also or alternatively be utilized in any number of different types of work functions commonly performed by machines which utilize propulsion circuits. For example, braking energy can be at least partially utilized in different work functions to: (a) minimize heat (e.g., by avoiding the use of a pressure-reducing valve to dissipate the energy); (b) minimize engine overspeed (e.g., by reducing the pump side pressure at port B to a level that results in minimum input torque transferred to the engine); (c) assist in machine acceleration; (d) enable unlimited towing; and/or (e) limit steering during towing.

One non-limiting object of the present disclosure is to provide a hydraulic circuit which includes a pump configured to be driven by a prime motor. The circuit further includes a hydrostatic motor fluidly coupled to the pump by first and second lines (i.e., supply and return lines), one or more work function actuators or accumulators fluidly coupled with at least one of the first and second lines, and valving operative to direct at least a portion of pressurized fluid output from the motor during braking operations to at least one of the one or more work function actuators or accumulators. These exemplary non-limiting components thereby reduce or prevent the prime motor (i.e., engine) from over-speeding, as well as minimize heat generation in the hydraulic circuit.

The non-limiting hydraulic circuits disclosed herein can optionally further include a pressure-reducing valve for converting hydraulic energy to thermal energy, wherein the valving is further operative to direct pressurized fluid from the motor to the pressure-reducing valve during braking. Over-speeding in the prime motor is thereby prevented.

In accordance with other non-limiting aspects of the present disclosure, the exemplary hydraulic circuit is optionally at least one of a hydrostatic or open machine propel circuit. The hydrostatic propel circuit optionally includes a plurality of motors and pumps, and the plurality of motors include at least one of a fixed, 2-position, or proportional motor. The open-circuit propel system optionally includes a plurality of motors and one pump, and the plurality of motors include at least one of a fixed, 2-position, or proportional motor.

In accordance with other non-limiting aspects of the present disclosure, the one or more work function actuators optionally can include at least one work motor of a fan drive motor, a generator motor, cylinders, rotary actuators, or any motor that is loaded during engine dynamic braking. The work motor can be part of a fixed or variable pump system, open-circuit or closed-loop hydrostatic system. The hydraulic circuit optionally further includes a work function pump configured to be de-stroked to zero displacement, or dump its output to a reservoir, during engine dynamic braking. The hydraulic circuit optionally further comprises a micro-controller. The hydraulic circuit can optionally be used in a hydrostatic drive of a machine for propelling the machine.

In accordance with other non-limiting aspects of the present disclosure, there is provided a method of controlling a hydraulic drive of a machine, the hydraulic drive including a pump adapted to be driven by a prime motor of the machine, a motor fluidly coupled to the pump by first and second lines for propelling the machine, and at least one of a work function actuator or an accumulator fluidly coupled with at least one of the first and second lines. The method includes, during machine deceleration, directing at least a portion of pressurized fluid output from the motor to at least one of the work function actuator or the accumulator to thereby prevent the prime motor from over-speeding and to minimize heat generation in the hydraulic circuit.

In accordance with other non-limiting aspects of the present disclosure, there is provided a hydraulic circuit that uses the braking energy of a hydrostatic propulsion system for: (a) emergency steering; (b) braking; (c) charging accumulator(s); (d) one or more work functions to prevent the engine from overspeed and minimize heat generation; (e) assisting acceleration; and/or (f) unlimited towing when the propulsion motor is running as a pump. The hydraulic circuit is optionally at least one of the hydrostatic or open-circuit propulsion systems. The hydrostatic propel circuit optionally includes a plurality of motors and pumps, wherein the plurality of motors include at least one of a fixed or variable motor. The open-circuit propel system optionally includes one pump and a plurality of motors, and wherein the motors include at least one of a fixed or variable motor. The accumulator can optionally be a standalone component, or in a charging system with a fixed or variable pump. The normal steering and braking system optionally has a fixed or variable pump.

In accordance with other non-limiting aspects of the present disclosure, the work function actuator can optionally include at least one work motor of a fan drive motor, a generator motor, cylinders, rotary actuators, or any motor that is loaded during engine dynamic braking, and wherein the work motor can be part of a fixed or variable pump system.

In accordance with other non-limiting aspects of the present disclosure, the hydraulic circuit optionally further includes a work function pump configured to be de-stroked to zero displacement, or dump its output to a reservoir, during engine dynamic braking.

In accordance with other non-limiting aspects of the present disclosure, the hydraulic valve manifold that directs the braking energy to all the functions optionally includes any type of hydraulic valve and/or solenoid valve. The braking energy is optionally from the high pressure at the propel motor side when the motor is running as a pump. The motor may run as a pump, for example, when: (a) the engine dies at high machine velocity on flat ground; (b) the engine dies while travelling downhill; (c) the machine is decelerating; and/or, (d) the machine is being towed in forward direction.

In accordance with other non-limiting aspects of the present disclosure, the braking energy can also optionally be from the high pressure at the propel motor side when the motor is running as a pump and the port B (e.g., return line) is blocked between the motor and the pump. In addition, the braking energy can optionally be from pressure at port B on the propel motor side if port A is high pressure when the machine travels forward direction. Furthermore, the braking energy can also optionally be from pressure at port A on the propel motor side if port B is high pressure when the machine travels in a forward direction. The hydraulic circuit optionally further comprises a micro-controller.

In accordance with other non-limiting aspects of the present disclosure, a hydraulic circuit is disclosed which includes a pump configured to be driven by a prime motor, a motor fluidly coupled to the pump by a supply line and a return line, at least one work function circuit fluidly coupled with at least one of the supply and return lines, and valving operative to direct at least a portion of pressurized fluid output from the motor during braking operations to the at least one work function circuit to thereby reduce or prevent the prime motor from over-speeding and/or to minimize heat generation in the hydraulic circuit.

In accordance with other non-limiting aspects of the present disclosure, the hydraulic circuit can optionally be a hydrostatic and/or open machine propel circuit.

In accordance with other non-limiting aspects of the present disclosure, the at least one work function circuit can optionally further include at least one of a work motor and/or a work function pump.

In accordance with other non-limiting aspects of the present disclosure, the work motor can optionally include one of a fan drive motor, a generator motor, cylinders, and/or rotary actuators.

In accordance with other non-limiting aspects of the present disclosure, the work function pump can optionally be configured to be de-stroked to zero displacement and/or to dump its output to a reservoir.

In accordance with other non-limiting aspects of the present disclosure, the hydraulic circuit can optionally further include one or more accumulators configured to be charged by the at least one work function circuit.

In accordance with other non-limiting aspects of the present disclosure, the accumulator can optionally be a standalone component or be included as part of a charging system having a fixed and/or variable pump.

In accordance with other non-limiting aspects of the present disclosure, the at least one work function circuit of the hydraulic circuit can optionally include an engine control circuit configured to minimize over-speeding in the prime motor, assist in acceleration, and/or permit unlimited towing.

In accordance with other non-limiting aspects of the present disclosure, the engine control circuit can optionally include one or more solenoid valves, an orifice, a pressure relief valve, one or more pressure transducers, one or more hydraulic pilot-operated valves, a check valve, a pressure-reducing valve, and combinations thereof.

In accordance with other non-limiting aspects of the present disclosure, the at least one work function circuit of the hydraulic circuit can optionally include a heat control circuit configured to minimize heat generation.

In accordance with other non-limiting aspects of the present disclosure, the heat control circuit can optionally have a fan pump and/or a fan drive motor.

In accordance with other non-limiting aspects of the present disclosure, the at least one work function circuit of the hydraulic circuit can optionally further include a braking energy circuit configured to control emergency steering and/or braking.

In accordance with other non-limiting aspects of the present disclosure, the braking energy circuit can optionally have a steering circuit control, a braking circuit control, and/or a hydraulic valve manifold configured to direct braking energy.

In accordance with other non-limiting aspects of the present disclosure, there is provided a hydrostatic propulsion system in a machine. The system includes a hydraulic circuit which can have a pump configured to be driven by an engine, a motor fluidly coupled to the pump by a supply line and a return line, the motor including a high-pressure port side and being configured to run as a pump. The system can also include a pressurized fluid output from the motor during a deceleration of the machine and at least one work function circuit fluidly coupled with at least one of the supply and return lines. The at least one work function circuit can include an engine control circuit configured to minimize over-speeding in the engine, assist in acceleration, and/or permit unlimited towing. The high-pressure port side of the motor can be configured to direct a braking energy generated from the deceleration to the at least one work function circuit.

In accordance with other non-limiting aspects of the present disclosure, the system can optionally further include one or more operating conditions in which the motor runs as a pump. The one or more operating conditions include, but are not limited to: the engine dying when the machine is operating at a high velocity on flat ground; the engine dying when the machine is travelling downhill; machine deceleration; the machine is being towed in a forward direction; a port of the return line being blocked between the motor and the pump; and/or the machine is traveling in a forward direction.

In accordance with other non-limiting aspects of the present disclosure, the at least one work function circuit of the system can optionally further include a heat control circuit configured to minimize heat generation.

In accordance with other non-limiting aspects of the present disclosure, the at least one work function circuit can optionally include a braking energy circuit configured to control emergency steering and/or braking and which can include one or more accumulators.

In accordance with other non-limiting aspects of the present disclosure, there is provided a method of controlling a hydraulic drive of a machine. The hydraulic drive includes a pump adapted to be driven by an engine of the machine, a motor fluidly coupled to the pump by a supply line and a return line and including a high-pressure port side, and at least one work function circuit fluidly coupled with at least one of the supply and return lines. The method can include directing at least a portion of a pressurized fluid output from the high-pressure port side of the motor to the at least one work function circuit and, returning the pressurized fluid back to the high-pressure port side of the motor when the motor is running as a pump; wherein the directing and returning prevents over-speeding in the prime motor and/or minimizes heat generation in the hydraulic drive.

In accordance with other non-limiting aspects of the present disclosure, the method can optionally further include one or more of: assisting in accelerating the machine; permitting unlimited towing of the machine; emergency steering and braking of the machine; and/or charging one or more accumulators. The assisting of the accelerating, the permitting of the unlimited towing, the emergency steering and braking, and/or the charging of one or more accumulators is being performed by the directing of the pressurized fluid to the at least one work function circuit.

In accordance with other non-limiting aspects of the present disclosure, the returning of the pressurized fluid back to the high-pressure port side of the motor when the motor is running as a pump can optionally occur when the engine dies while the machine is operating at a high velocity on flat ground, the engine dies while the machine is travelling downhill, the machine decelerates, the machine is being towed in a forward direction, a port of the return line is blocked between the motor and the pump, and/or the machine is traveling in a forward direction.

These and other objects and advantages will become apparent from the discussion of the distinction between the present disclosure and the prior art and when considering the non-limiting embodiments of the disclosure as shown in the accompanying drawings.

BRIEF DESCRIPTION OF THE DRAWINGS

Reference may now be made to the drawings, which illustrate various embodiments that the disclosure may take in physical form and in certain parts and arrangements of parts wherein.

DETAILED DESCRIPTION OF NON-LIMITING EMBODIMENTS

Figure 1:
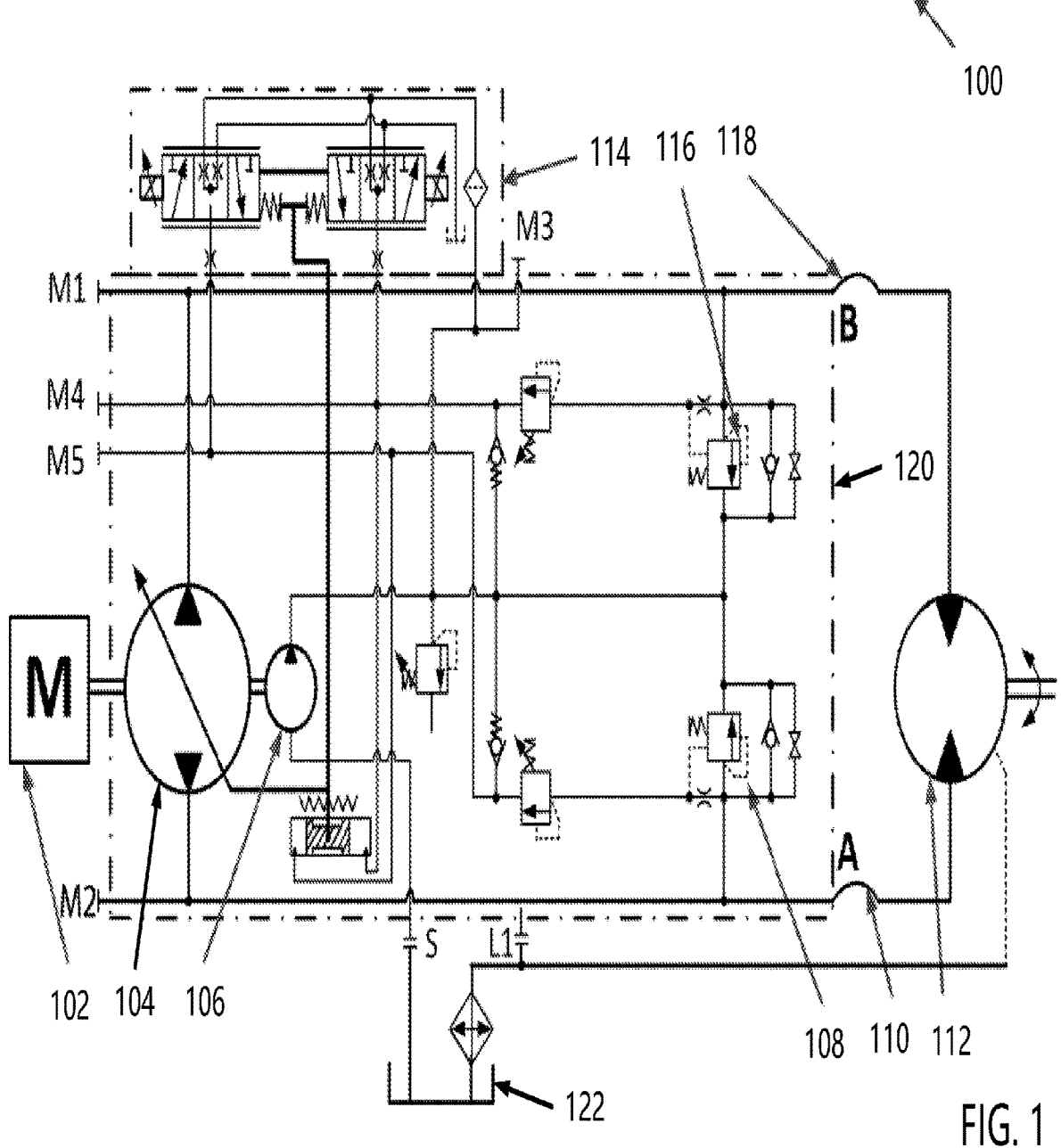
FIG. 1 is a schematic diagram of an exemplary prior art hydrostatic propel system with one pump and one motor.

Referring now in greater detail to the drawings, wherein the showings are for the purpose of illustrating non-limiting embodiments of the invention only and not for the purpose of limiting the invention, FIG. 1 illustrates a typical prior art closed-loop hydrostatic propulsion system 100. The system 100 generally includes a hydrostatic pump 104 fluidly coupled to one or more hydrostatic motor(s) 112 forming a main hydraulic loop 120. The hydrostatic motor(s) 112 can be fixed or variable. The pump 104 is typically connected to a prime motor 102, such as an internal combustion engine or the like, of a machine or vehicle. The prime motor 102 drives the pump 104 to deliver hydraulic fluid to the motor 112 via supply/return lines 110/118. The motor 112 drives one or more wheels, tracks, etc. to propel the vehicle.

A valve 114 (electric proportional/on-off, or hydraulic proportional/on-off, or manual proportional/on-off, or non-servo direct displacement control) inside the pump 104 controls the speed and direction of the motor 112 by modulating flow rate and changing flow direction supplied to the motor 112 by the pump 104. A charge pump 106 replenishes the main hydraulic loop 120 with cool and clean hydraulic fluid from a sump (reservoir) 122. High pressure relief valves 108/116 provide overpressure protection for the main hydraulic loop. The machine is designed to travel forward when port A of the motor 112 and the pump 104 is high pressure, and travel in reverse when port B of the motor 112 and the pump 104 is high pressure.

When moving in a forward direction and the machine begins to decelerate (i.e., when the machine shifts to a "braking mode"), pump 104 de-strokes toward 0 degrees and Port A pressure drops, and port B pressure increases. In braking mode, the motor 112 gathers the vehicle's momentum and runs as a pump, while pump 104 runs as a motor. The input torque from the pump 104 transfers to the prime motor 102 (i.e., the machine's engine) and can cause overspeed in the engine due to insufficient engine braking power. The more input torque, the more engine overspeed. Excessive overspeed may damage the engine 102 and the pump 104.

Higher pressure on port B at the motor 112 side provides sufficient braking torque to stop the machine. Lower pressure on port B at the pump 104 side reduces the input torque from the pump 104 to the engine and avoids excessive engine overspeed.

There is typically little or no engine overspeed risk during machine deceleration when operating in the reverse direction because the maximum reverse speed is normally much slower.

Figure 2:
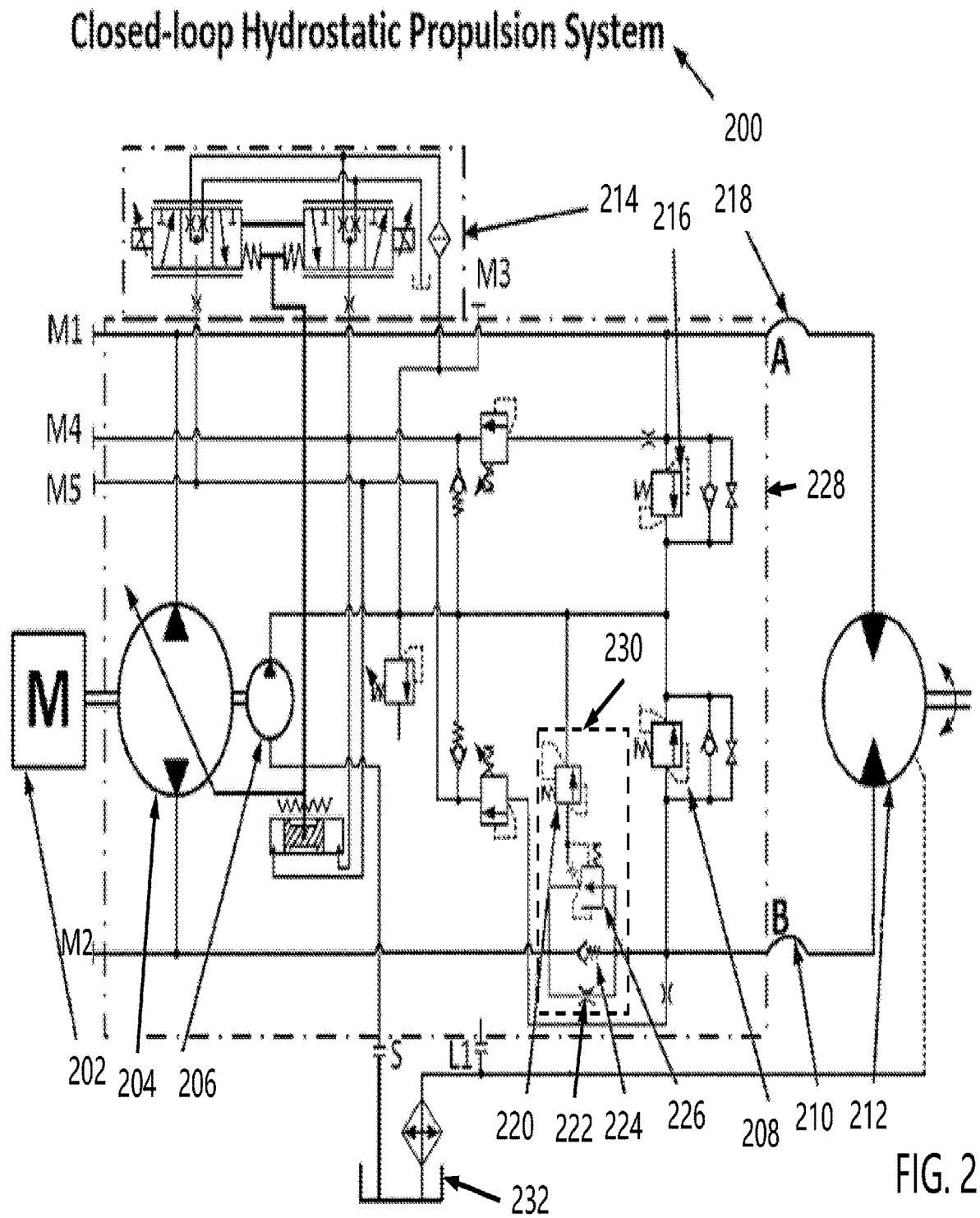
FIG. 2 is a schematic diagram of an exemplary prior art hydrostatic propel system with a speed limiter for engine overspeed protection.

FIG. 2 illustrates a prior art closed-loop hydrostatic system 200 with a similar configuration to the hydraulic circuit 100 of FIG. 1. That is, the closed-loop hydrostatic propulsion system 200 of FIG. 2 includes a hydrostatic pump 204, a main hydraulic loop 228, and one or more hydrostatic motor(s) 212. The pump 204 is connected to the prime motor 202 of a machine or vehicle. The prime motor drives the pump 204 to deliver hydraulic fluid to the motor 212 via supply/return lines 210/218. A valve 214 inside the pump 204 controls the speed and direction of the motor 212 by modulating flow rate and changing flow direction supplied to the motor 212 by the pump 204. A charge pump 206 replenishes the main hydraulic loop 228 with cool and clean hydraulic fluid from a sump (reservoir) 232. High pressure relief valves 208/216 provide overpressure protection for the main hydraulic loop.

The prior art closed-loop hydrostatic system 200 illustrated in FIG. 2 differs from system 100 of FIG. 1 in that the main hydraulic loop 228 includes a speed limiter circuit 230 for preventing engine overspeed. The speed limiter circuit 230 includes a pilot pressure relief valve 220, a bypass orifice 222, and a pressure-reducing valve 226. Excessive hydrostatic power is converted to heat by the pressure-reducing valve 226. The heat energy is then dissipated to the ambient environment through the transmission housing or via an associated hydraulic fluid cooler. Bypass check valve 224 is for free flow when the machine travels in reverse.

During operation of a machine which utilizes a closed-loop hydrostatic system having a speed limiter circuit, such as system 200 and speed limiter circuit 230 illustrated in FIG. 2, the speed limiter circuit functions to automatically limit the pump torque input to the engine. This may occur when, for example, the pump 204 is being driven as a motor during vehicle deceleration. Accordingly, when the system 200 is in braking mode, the hydrostatic motor side may have a port B pressure of about 510 bar, for example. The speed limiter circuit 230 could then function to limit the pump side pressure of port B to some lower pressure such as about 170 bar, for example.

Non-limiting aspects of the present disclosure are directed to a system (and method) that uses the braking energy of a hydraulic propel system for emergency steering, braking, and/or charging accumulator(s) when the engine dies at high machine velocity on flat ground, when the engine dies while the machine travels downhill, for work functions to minimize heat generation and engine over-speed during machine deceleration, for assisting acceleration, and/or for unlimited towing and limited steering during towing.

Non-limiting aspects of the present disclosure can be used in connection with a wide range of hydraulic circuits to direct braking energy to run emergency steering, braking and/or charge accumulator(s) in the event the prime motor (engine) dies. Certain non-limiting embodiments include propel systems with one or pumps and one or more motors. The motor(s) can be fixed and/or variable.

Non-limiting aspects of the present disclosure can be implemented in a wide variety of hydraulic drive systems or other hydraulic circuits and methods. In particular, certain aspects are directed to circuit designs that direct braking energy to any type of work function actuators (e.g., cylinders, rotary actuators, etc.) that are loaded, such as a fan motor and/or a generator motor, etc. in a fixed or variable pump system, open-circuit or closed-loop hydrostatic. The work function pump (if present) either dumps its output to a reservoir or de-strokes to 0 degrees during machine deceleration.

Non-limiting aspects of the present disclosure can be implemented in a wide variety of hydraulic circuit designs and, in particular, certain aspects are directed to circuit designs wherein a valve manifold directs the braking energy to functions using any type and/or combination of hydraulic valves and/or solenoid valves.

Figure 3A:
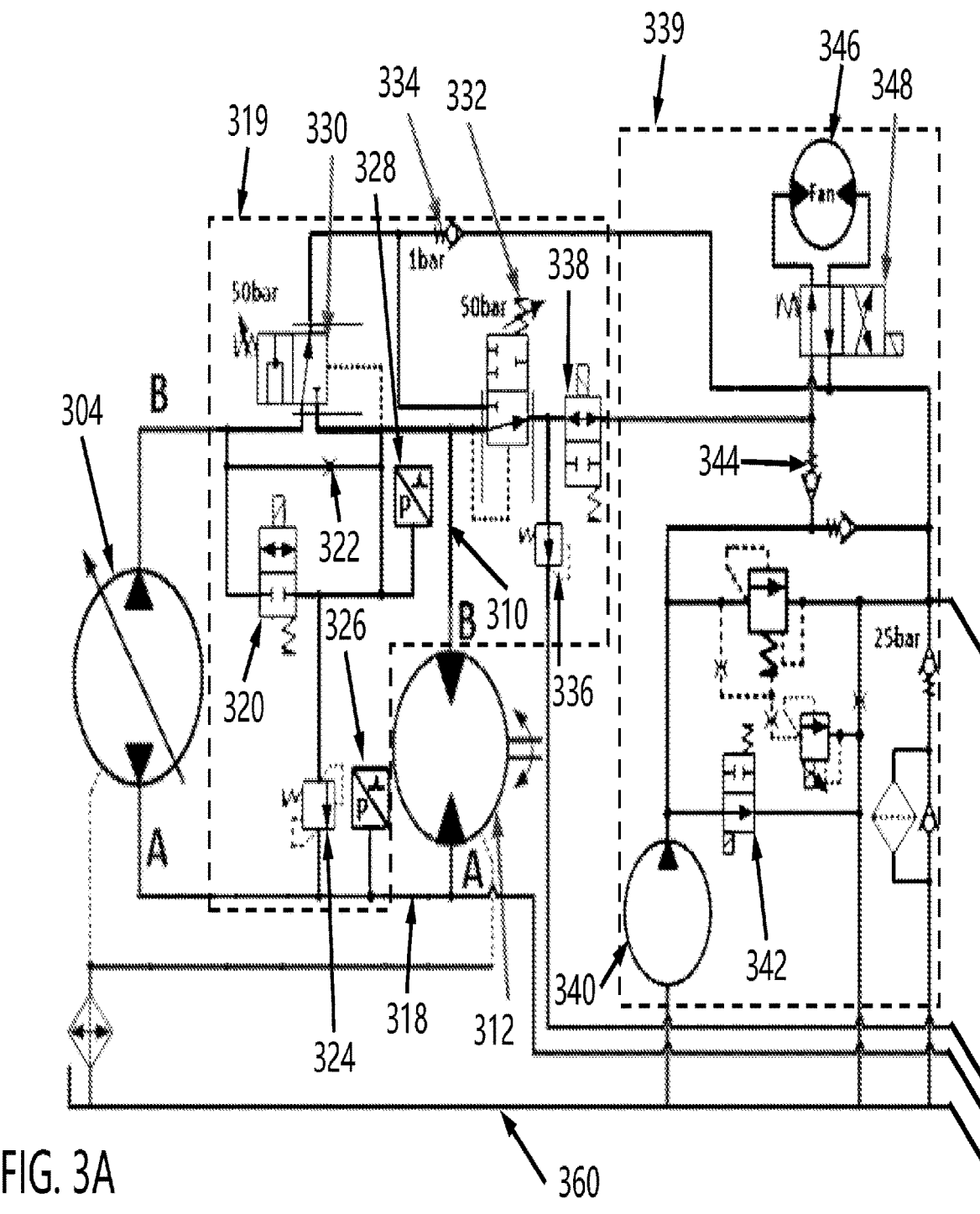
FIG. 3A is a schematic diagram of an exemplary hydrostatic propel system with braking energy recovery/use for emergency steering, braking, charging accumulator(s), work functions to prevent engine from overspeed, assisting acceleration, and/or unlimited towing in accordance with the present disclosure.
Figure 3B:
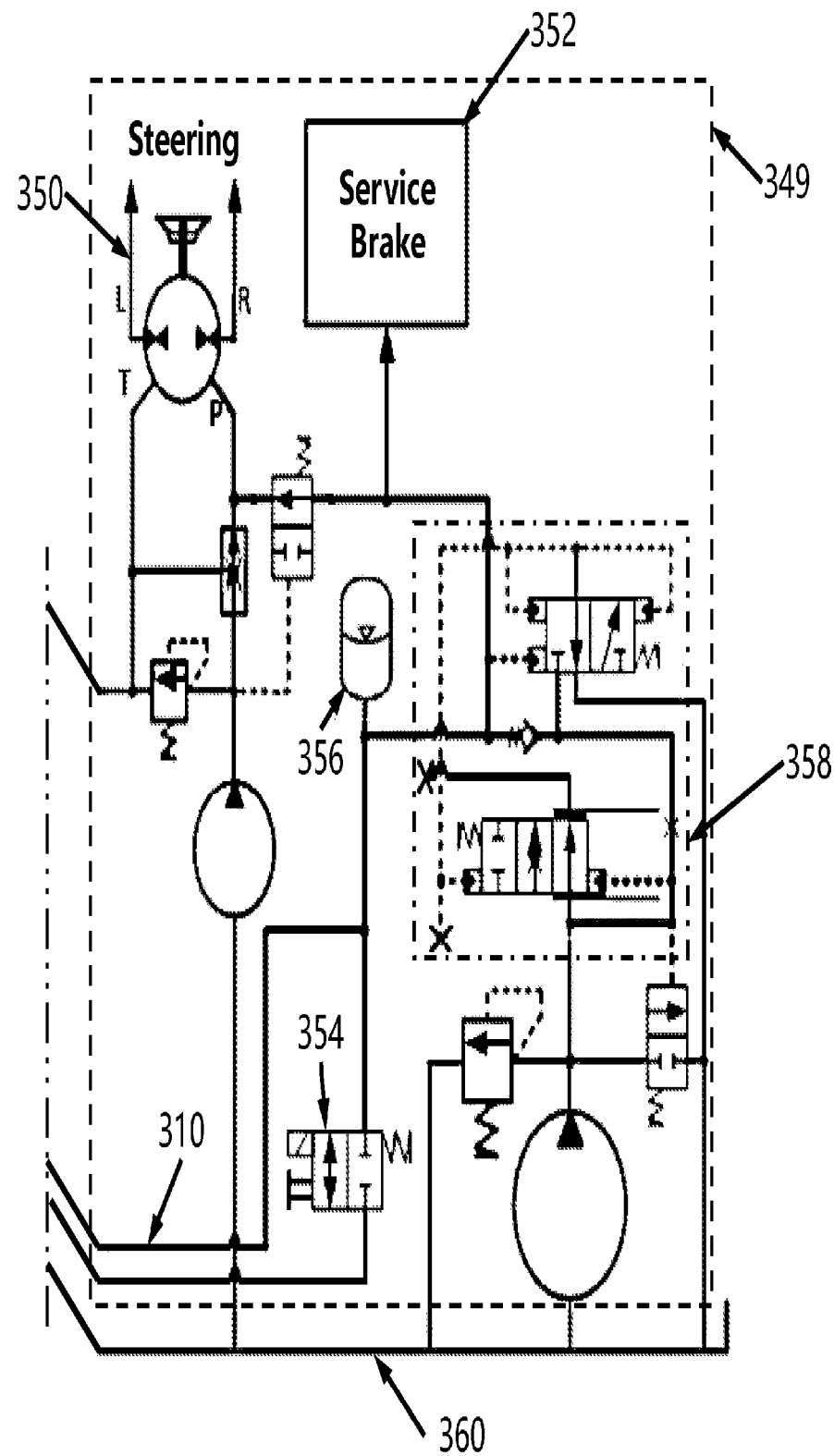
FIG. 3B is a portion of the exemplary hydrostatic propel system of FIG. 3A which specifically shows a schematic diagram for a braking energy circuit to recover/use braking energy for the emergency steering, braking, and charging accumulator(s)

Referring now to FIGS. 3A and 3B, an exemplary hydraulic circuit 300 in accordance with the present disclosure is illustrated. The exemplary hydraulic circuit 300 generally includes a hydrostatic pump 304 and one or more hydrostatic motor(s) 312. The pump 304 is connected to a prime motor (not shown) of a machine or vehicle. The prime motor of a machine or vehicle as disclosed herein may be, for example, a hydrostatic transmission of the hydrostatically-driven vehicle such as, for example, a forklift truck or construction machinery. However, this aspect is non-limiting and other types of vehicles or machines can be used with exemplary hydraulic circuit 300. The prime motor drives the pump 304 to deliver hydraulic fluid to the motor 312 via first and second lines (i.e., supply/return lines 310/318).

In the embodiment illustrated in FIGS. 3A and 3B, the braking energy is utilized for emergency steering, braking, charging accumulator(s), and/or one or more of work functions (hydraulic actuators) to minimize heat generation, minimize engine overspeed, assisting acceleration and/or assisting unlimited towing. More particularly, circuit 300 includes one or more dedicated work function circuits configured to perform one or more of the aforementioned tasks. Generally, each dedicated work function circuit can include one or more work function actuators and/or one or more work function pumps. The function actuators are typically a work motor; however, such a configuration is non-limiting. Exemplary work motors include but are not limited to fan drive motors, generator motors, cylinders, rotary actuators, and/or any motor that is loaded during engine dynamic braking.

In one non-limiting configuration, hydraulic circuit 300 includes a work function circuit 319 configured to minimize engine overspeed, assist in acceleration, and permit unlimited towing (i.e., engine control circuit 319). As illustrated in FIG. 3A, the engine control circuit 319 generally includes one or more solenoid valves 320/338, orifice 322, relief valve 324, one or more pressure transducers 326/328, one or more hydraulic pilot-operated valves 330/332, check valve 334, and pressure reducing valve 336. However, such a configuration is non-limiting.

In another non-limiting configuration, hydraulic circuit 300 can further include work function circuit 339 configured to minimize heat generation (i.e., heat control circuit 339). As illustrated in FIG. 3A, the heat control circuit 339 is generally a fixed displacement pump system that includes fan pump 340, solenoid valve 342, check valve 344, fan drive motor 346, and 4-way valve 348. However, such a configuration is non-limiting.

In additional non-limiting configurations, hydraulic circuit 300 can also include a braking energy circuit 349 configured to control emergency steering and braking as well as accumulator(s) charging. As illustrated in FIG. 3B, the braking energy circuit 349 generally includes steering control circuit 350, braking control circuit 352, solenoid valve 354, accumulator(s) 356, and hydraulic valve manifold 358. However, such a configuration is non-limiting. The steering control circuit 350 and braking control circuit 352 can optionally include one or more fixed or variable pumps. The hydraulic valve manifold 358 of the braking energy circuit 349 typically includes any number of different types of hydraulic valves and/or solenoid valves which can be configured to direct the braking energy to each of the dedicated work functions, such as charging accumulator(s) 356, enabling steering and braking by control circuits 350/352, powering heat control circuit 339, and enabling engine control circuit 319. However, such a configuration is non-limiting.

Moreover, the hydraulic circuit 300 and each of the dedicated work function circuits (e.g., engine control circuit 319, heat control circuit 339, braking energy circuit 349) include valving (shown but not numbered) which is generally operative to direct at least a portion of pressurized fluid output from the motor during braking operations to at least one of the one or more work function circuits or accumulators. It should also be appreciated that other types of work functions can additionally or alternatively be powered by the braking energy without departing from the scope of this disclosure.

The exemplary hydraulic circuit 300 illustrated in FIGS. 3A and 3B is advantageously enabled to respond to various states of machine operation. For example, exemplary hydraulic circuit 300 may operate in response to machine operation states such as: when the engine dies at high machine velocity on flat ground; when the engine dies while the machine travels downhill; during machine deceleration; when the machine is being towed; and/or any other situation when motor 312 is running as a pump and the pump 304 is running as a motor. During these situations, port B pressure goes up, and port A pressure goes down. The hydraulic pilot-operated valves 330 and 332 shift when port B pressure reaches a certain predetermined value (e.g., 50 bar, 75 bar, 45 bar, etc.). By blocking port B between the pump 304 and the motor 312, the braking energy from high-pressure port B at the motor 312 side is transferred to the various other work functions (e.g., transferred to run steering, braking, charging accumulator(s), etc.).

During operation of exemplary hydraulic circuit 300, the pressure-reducing valve 336 setting determines the pressure to which the accumulator 356 is charged. When the accumulator 356 is fully charged, the micro-controller (not shown) receives a signal from the pressure transducer 328 and energizes the solenoid valves 342 and 338. The fan pump 340 dumps hydraulic fluid to reservoir 360 via solenoid valve 342. The braking energy is directed to run the fan motor 346 via a 4-way valve 348. The check valve 344 blocks fluid from back flowing into the fan pump 340.

The exemplary micro-controller (not-shown) described herein can include a processor for operating software logic and can be connected to a plurality of sensors which detect various characteristics of the hydraulic circuit. For example, sensors can be positioned to detect engine load, system speed, differential pressures, etc.

The return hydraulic fluid from the fan motor 346 goes back to port B at the pump 304 side and/or the reservoir 360. This minimizes input torque from the pump 304 to the engine, preventing or reducing engine overspeed.

Excess hydraulic fluid goes through the relief valve 324 to the low side of the loop. This minimizes heat generation in the system.

In use, if the engine dies at machine high velocity on flat ground or if the engine dies when the machine travels downhill, the braking energy provides pressurized hydraulic fluid from the high-pressure port B of the motor 312 for emergency steering and/or braking while charging the accumulator(s) at the same time.

An orifice 322 and the relief valve 324 determine how much of the braking power is converted to heat, with the rest being the input power from the pump 304 to the engine if the valve 332 gets stuck in a blocking position.

It should be appreciated that the hydrostatic braking power of the machine is not negatively influenced by the features of the present disclosure. During use, the motor 312 always records the maximum braking pressure as if the features don't exist. Only the fan motor 346, the check valve 344 and the 4-way valve 348 are exposed to the maximum braking pressure during engine dynamic braking. As such, they should be rated to the maximum braking pressure. The braking energy may also make the fan motor 346 run faster than normal speed. Accordingly, the system design should account for the fan motor 346 maximum speed to remain within its limits when subjected to maximum braking pressure.

When the machine travels in reverse direction, the solenoid valve 320 is energized and the valve 338 is de-energized. Port B is high pressure. During this operation, the port B between the pump 304 and the motor 312 is connected. Port B is blocked from fan drive motor 346 and from the accumulator 356 after the accumulator 356 is fully charged to the pressure-reducing valve 336 setting.

When the machine accelerates in a forward direction, the solenoid valve 320 is energized and the valve 338 is de-energized. Port B is low pressure and is connected between the pump 304 and the motor 312. The port B is blocked from accumulator 356 and fan drive motor 346. If the machine does not have sufficient horse power to accelerate, or if an acceleration boost is desired, port A pressure drops to below a certain value (e.g., 200 bar or any other value), the micro-controller (not shown) receives a signal from the pressure transducer 326 and energizes the solenoid valve 354, the accumulator 356 discharges energy to assist acceleration until it is fully discharged, then the solenoid valve 354 is de-energized.

When the machine is being towed in a forward direction, the motor 312 runs as a pump. The high pressure at port B shifts hydraulic pilot-operated valves 330 and 332. Port A and port B of the motor 312 are connected when the solenoid valve 354 is manually overridden. The towing is unlimited because the pump 304 is bypassed.

If the accumulator(s) 356 is fully charged before the towing, the steering function can be run to discharge the accumulator(s) 356. The steering is limited because the return hydraulic fluid from the steering is draining out of the loop. It may cause damage to the pump 304 and motor 312 when there is not sufficient hydraulic fluid in the loop. In any case, there typically is not much need for steering during towing and this will not affect the unlimited towing.

It should be appreciated that the accumulator 356, as illustrated in FIGS. 3A and 3B, is shown as being included with a charging system. However, such a configuration is non-limiting. For example, the accumulator could also be provided as a standalone component. Moreover, the accumulator 356 in FIGS. 3A and 3B is illustrated as part of a charging system with one or more fixed pumps. However, this is non-limiting, and it should be understood that the charging system and accumulator could also utilize one or more variable pumps, or a combination of fixed and variable pumps, without departing from the scope of the present disclosure.

Figure 4A:
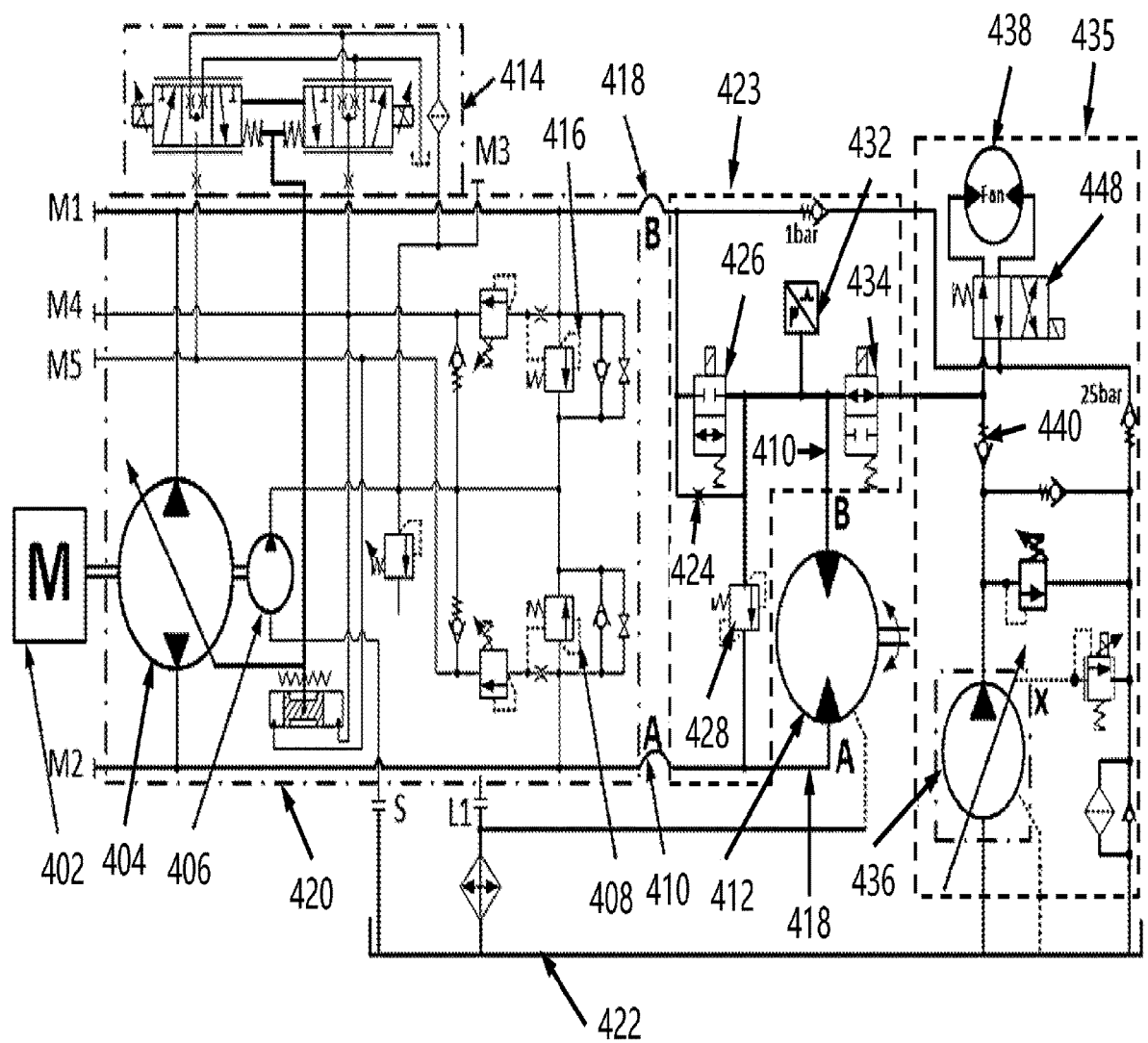
FIG. 4A is a schematic diagram of an exemplary hydrostatic propel system in accordance with the present disclosure for engine overspeed protection including a fan drive motor in an electronic diesel control ("EDC") pump system.
Figure 4B:
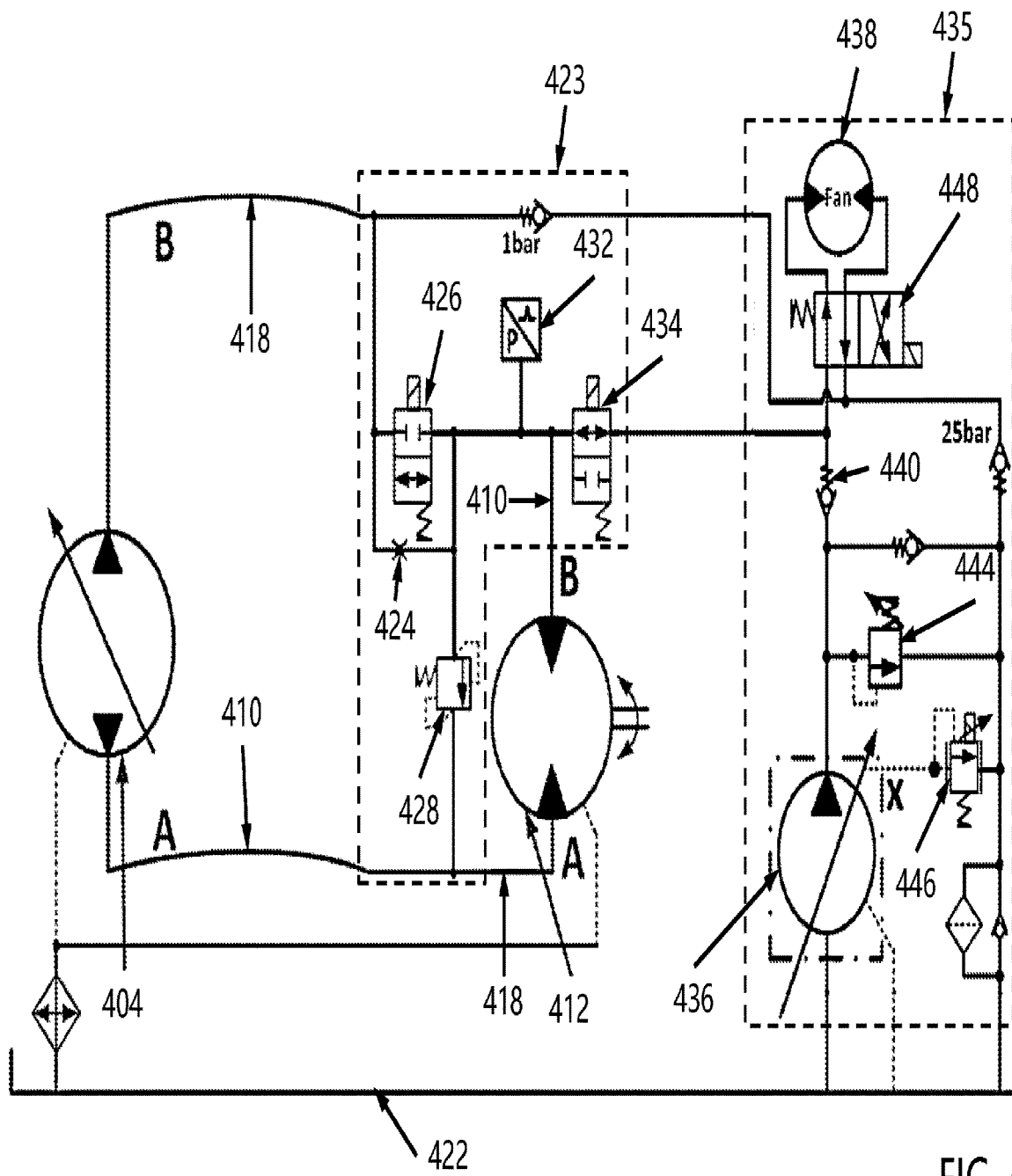
FIG. 4B is a simplified version of the schematic diagram of FIG. 4A.

Referring now to FIGS. 4A and 4B, an exemplary hydraulic propel system 400 in accordance with the present disclosure is shown including a hydraulic fan drive system with an electronic diesel control ("EDC") pump. FIG. 4B is a simplified version of FIG. 4A, and like reference numerals have been used to identify identical components. The exemplary hydraulic propel system 400 includes a hydrostatic pump 404, a main hydraulic loop 420, and one or more hydrostatic motor(s) 412. The pump 404 is connected to the prime motor 402 of a machine or vehicle. The prime motor drives the pump 404 to deliver hydraulic fluid to the motor 412 via supply/return lines 410, 418. A valve 414 inside the pump 404 controls the speed and direction of the motor 412 by modulating flow rate and changing flow direction supplied to the motor 412 by the pump 404. A charge pump 406 replenishes the main hydraulic loop 420 with cool and clean hydraulic fluid from a sump (reservoir) 422. High-pressure relief valves 408, 416 provide overpressure protection for the main hydraulic loop.

In one non-limiting configuration, hydraulic propel system 400 includes a work function circuit 423 configured to minimize engine overspeed (i.e., engine control circuit 423). As illustrated in FIGS. 4A and 4B, the engine control circuit 423 generally includes one or more solenoid valves 426, 434, orifice 424, relief valve 428, and one or more pressure transducers 432. However, such a configuration is non-limiting.

In another non-limiting configuration, hydraulic propel system 400 can further include work function circuit 435 configured to minimize heat generation (i.e., heat control circuit 435). As illustrated in FIGS. 4A and 4B, the heat control circuit 435 is generally a variable displacement pump system that includes fan pump 436, fan drive motor 438, and check valve 440. However, such a configuration is non-limiting.

During engine dynamic braking, the micro-controller (not shown) shifts solenoid valves 426 and 434 and de-strokes the fan pump 436 to 0 degrees when pressure transducer 432 measures port B pressure higher than a predetermined value (e.g., 25 bar, etc.). High-pressure relief valves 444, 446 provide overpressure protection for the variable fan pump system (i.e., heat control circuit 435). The hydraulic fluid at propel motor 412 side is directed to the fan motor 438 and 4-way valve 448 only due to check valve 440. The return fluid from the fan motor 438 goes back to the port B at propel pump 404 side at a reduced pressure. The excessive hydraulic fluid goes through the relief valve 428 to the low side of the loop. This minimizes heat and input torque from the pump 404 to the engine 402.

The orifice 424 and relief valve 428 determine how much of the braking power is converted to heat. The remaining braking power is input from the pump 404 to the engine 402, but only if solenoid valve 434 fails.

It should be appreciated that the hydrostatic braking power of the machine is not negatively influenced by the features of the present disclosure. During use, the motor 412 always records the maximum braking pressure as if the features don't exist. Only the fan motor 438, the 4-way valve 448, and check valve 440 are exposed to the maximum braking pressure during engine dynamic braking. These components should be rated to the maximum braking pressure. The braking energy may also make the fan motor 438 run faster than normal speed. Accordingly, system design should account for the fan motor 438 maximum speed to remain within its limits when subjected to maximum braking pressure.

Figure 5:
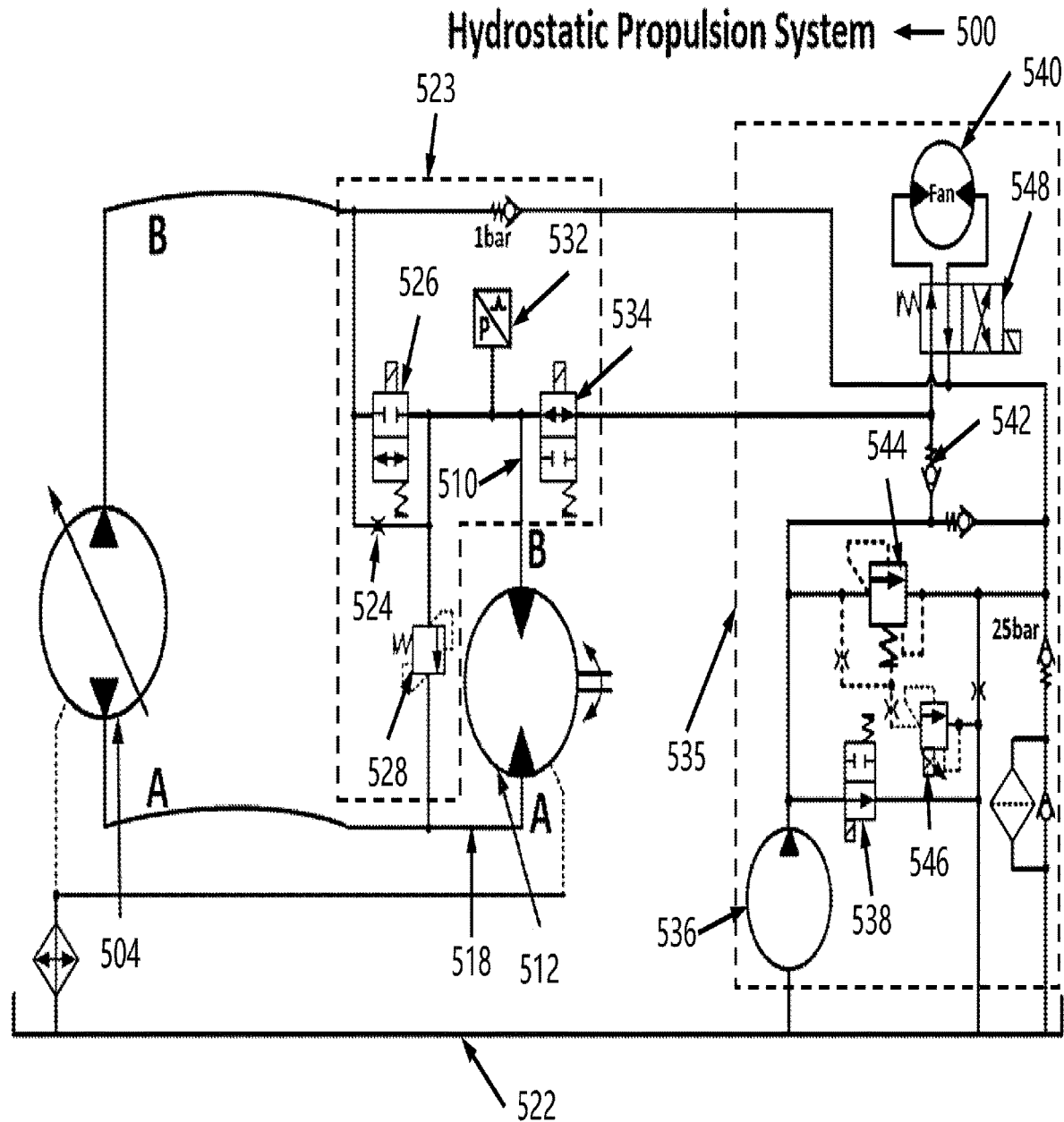
FIG. 5 is a schematic diagram of an exemplary hydrostatic propel system in accordance with the present disclosure for engine overspeed protection, including a hydraulic fan drive motor in a fixed displacement pump system.

Referring now to FIG. 5, an exemplary hydraulic propel system 500 in accordance with the present disclosure is shown. System 500 illustrated in FIG. 5 is substantially similar to system 400 illustrated in FIG. 4. However, system 500 is a fixed pump fan drive system in accordance with the present disclosure, as opposed to the variable pump system 400. The exemplary hydraulic propel system 500 includes a hydrostatic pump 504 and one or more hydrostatic motor(s) 512. The pump 504 is connected to the prime motor (not shown) of a machine or vehicle. The prime motor drives the pump 504 to deliver hydraulic fluid from a sump (reservoir) 522 to the motor 512 via supply/return lines 510, 518.

In one non-limiting configuration, hydraulic propel system 500 includes a work function circuit 523 configured to minimize engine overspeed (i.e., engine control circuit 523). As illustrated in FIG. 5, the engine control circuit 523 generally includes one or more solenoid valves 526, 534, orifice 524, relief valve 528, and one or more pressure transducers 532. However, such a configuration is non-limiting.

In another non-limiting configuration, hydraulic propel system 500 can further include work function circuit 535 configured to minimize heat generation (i.e., heat control circuit 535). As illustrated in FIG. 5, the heat control circuit 535 is generally a fixed pump system that includes fan pump 536, a solenoid valve 538, and a fan drive motor 540. However, such a configuration is non-limiting.

During engine dynamic braking, the micro-controller (not shown) shifts solenoid valves 526, 534 and dumps fan pump 536 to reservoir 522, via solenoid valve 538, when pressure transducer 532 measures port B pressure higher than a predetermined value (e.g., 25 bar, etc.). High pressure relief valves 544, 546 provide overpressure protection for the fixed fan pump system (i.e., heat control circuit 535). The hydraulic fluid at propel motor 512 side is directed to the fan motor 540 and 4-way valve 548 only due to check valve 542. The return hydraulic fluid from fan motor 540 goes back to port B at propel pump 504 side at a reduced pressure. The excessive hydraulic fluid goes through the relief valve 528 to the low side of the loop. This minimizes heat and input torque from the pump 504 to the engine.

The orifice 524 and relief valve 528 determine how much of the braking power is converted to heat. The remaining braking power is input from the pump 504 to the engine if the valve 534 gets stuck in blocking position.

It should be appreciated that the hydrostatic braking power of the machine is not negatively influenced by the features of the present disclosure. During use, the motor 512 always records the maximum braking pressure as if the features don't exist. Only the fan motor 538, the 4-way valve 548, and check valve 542 are exposed to the maximum braking pressure during engine dynamic braking. They should be rated to the maximum braking pressure. The braking energy may also make the fan motor 538 run faster than normal speed. Accordingly, system design should account for the fan motor 438 maximum speed to remain within its limits when subjected to maximum braking pressure.

Figure 6A:
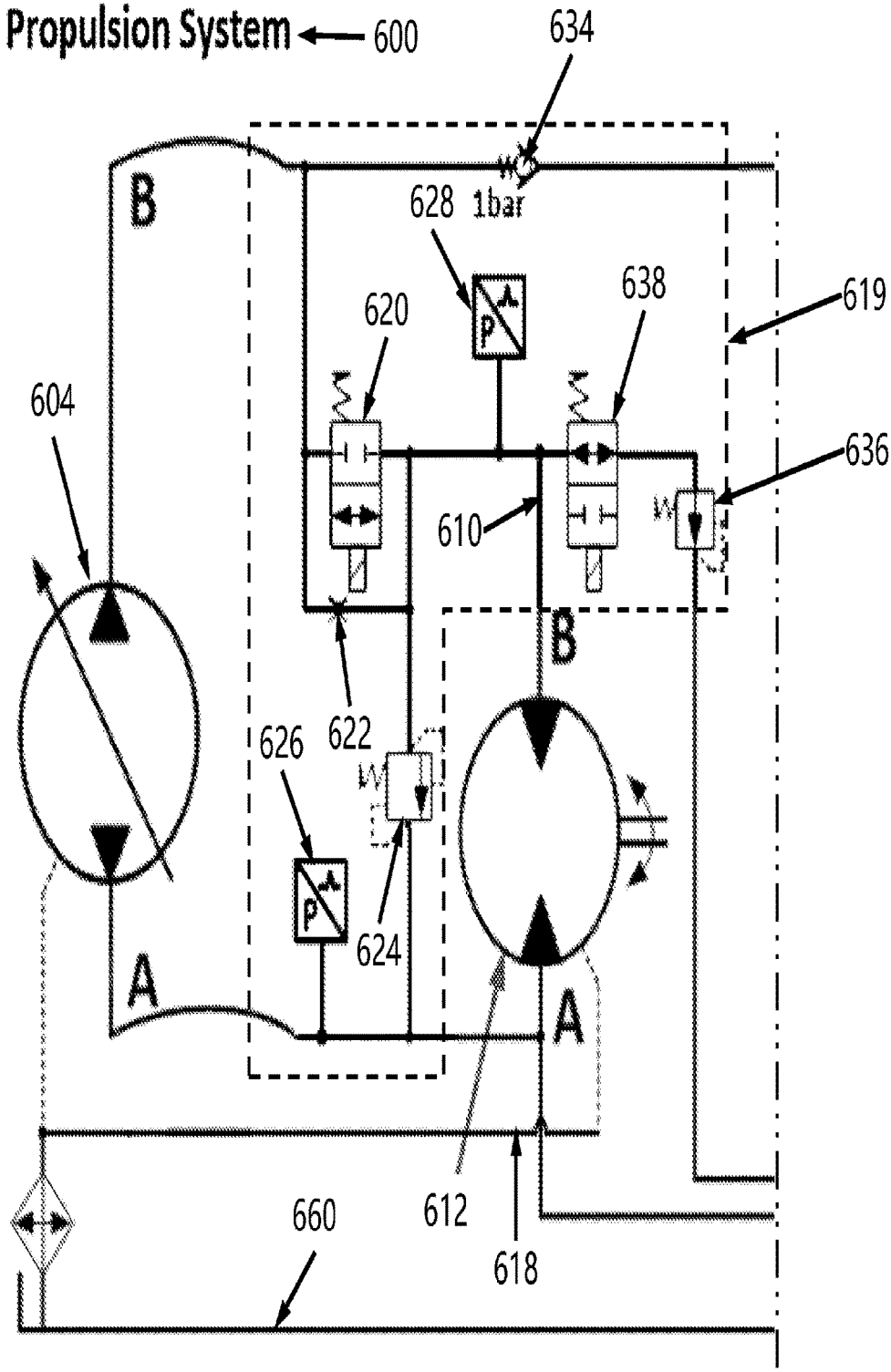
FIG. 6A is a schematic diagram of an exemplary hydrostatic propel system in accordance with the present disclosure for engine overspeed protection, including an accumulator charging system and emergency steering and braking; and, FIG. 6B is a portion of the exemplary hydrostatic propel system of FIG. 6A which specifically shows a schematic diagram for a braking energy circuit to recover/use braking energy for the accumulator charging system and emergency steering and braking.
Figure 6B:
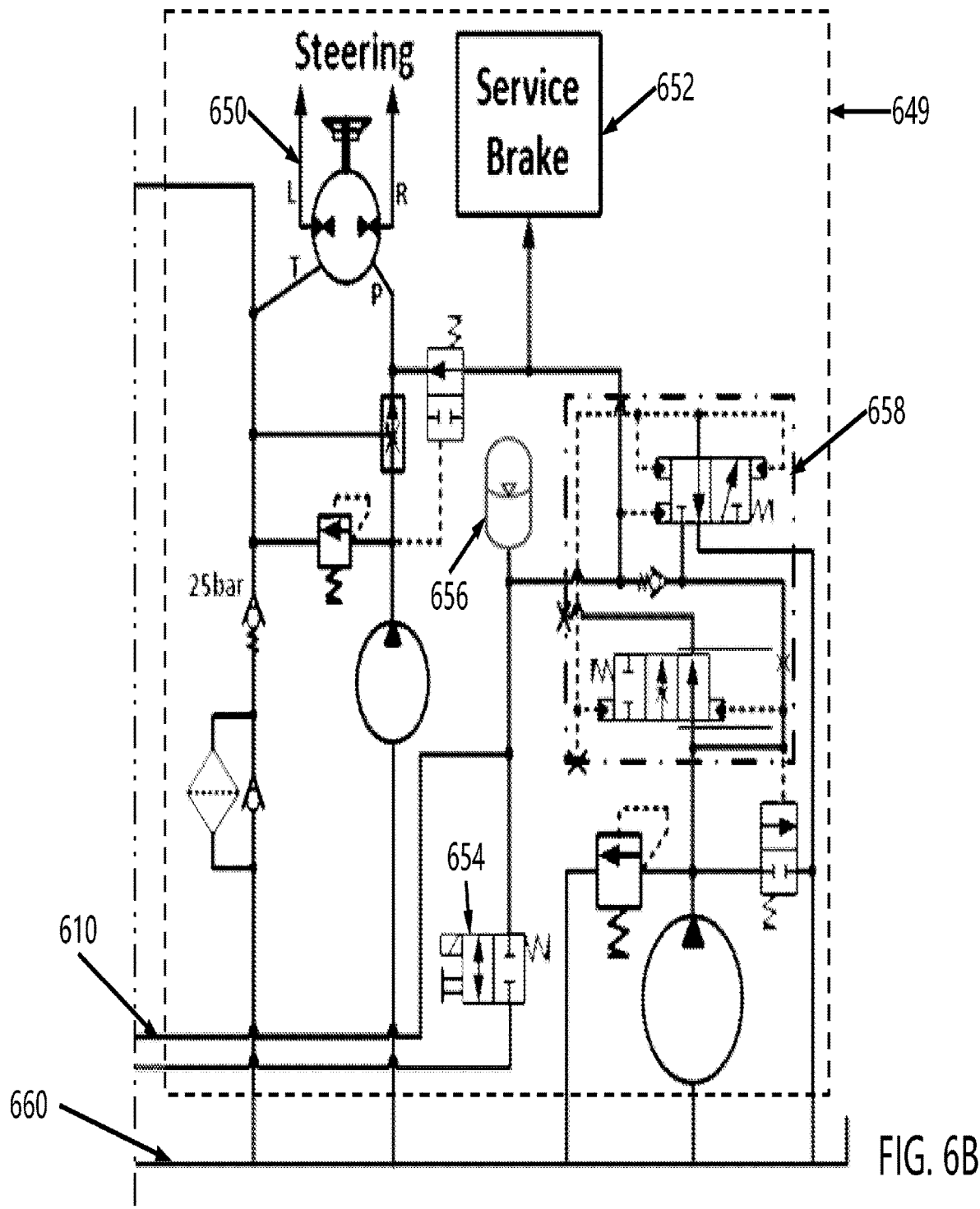

Referring now to FIGS. 6A and 6B, there is illustrated a non-limiting exemplary embodiment of hydraulic circuit 600 in accordance with aspects of the present disclosure. In this embodiment, braking energy is utilized for an accumulator charging system and emergency steering and braking. More particularly, circuit 600 includes one or more dedicated work function circuits configured perform the aforementioned tasks. In one non-limiting configuration, hydraulic circuit 600 includes a work function circuit 619 configured to minimize engine overspeed, assist in acceleration, and permit unlimited towing (i.e., engine control circuit 619). As illustrated in FIG. 6A, the engine control circuit 619 generally includes one or more solenoid valves 620, 638, orifice 622, relief valve 624, one or more pressure transducers 626, 628, check valve 634, and pressure-reducing valve 636. However, such a configuration is non-limiting.

In another non-limiting configuration, hydraulic circuit 600 can also include a braking energy circuit 649 configured to control emergency steering and braking as well as accumulator(s) charging. As illustrated in FIG. 6B, the braking energy circuit 649 generally includes steering control circuit 650, braking control circuit 652, solenoid valve 654, accumulator(s) 656, and hydraulic valve manifold 658. However, such a configuration is non-limiting. The steering control circuit 650 and braking control circuit 652 can optionally include one or more fixed and/or variable pumps. The hydraulic valve manifold 658 of the braking energy circuit 649 typically includes any number of different types of hydraulic valves and/or solenoid valves which can be configured to direct the braking energy to each of the dedicated work functions, such as charging accumulator(s) 656, enabling steering and braking by control circuits 650/652, and/or enabling engine control circuit 619. However, such a configuration is non-limiting.

Moreover, the hydraulic circuit 600 and each of the dedicated work function circuits (e.g., engine control circuit 619 and braking energy circuit 649) include valving (shown but not numbered) which is generally operative to direct at least a portion of pressurized fluid output from the motor during braking operations to at least one of the one or more work function circuits or accumulators. It should also be appreciated that other types of work functions can additionally or alternatively be powered by the braking energy without departing from the scope of this disclosure.

The exemplary hydraulic circuit 600 illustrated in FIGS. 6A and 6B is advantageously enabled to respond to various states of machine operation. For example, exemplary hydraulic circuit 600 may operate in response to machine operation states such as: when the engine dies at high machine velocity on flat ground; when the engine dies while the machine travels downhill; during machine deceleration; when the machine is being towed; and/or any other situation when motor 612 is running as a pump and the pump 604 is running as a motor. During these situations, port B pressure goes up, and port A pressure goes down.

During operation of exemplary hydraulic circuit 600 (i.e., during dynamic engine braking) the pressure-reducing valve 636 setting determines the pressure to which the accumulator 656 is charged. When the accumulator 656 is fully charged, the micro-controller (not shown) receives a signal from the pressure transducer 628 and shifts solenoid valves 620 and 638. The signal can report that port B pressure is higher than a set value (e.g., 25 bar). By blocking port B between the pump 604 and the motor 612, the braking energy from high-pressure port B at the motor 612 side is transferred to the various other work functions (e.g., transferred to run steering, braking, charging accumulator(s), etc.).

The return hydraulic fluid from the other work function circuits goes back to port B at the pump 604 side and/or the reservoir 660. This minimizes input torque from the pump 604 to the engine, preventing or reducing engine overspeed. Excess hydraulic fluid goes through the relief valve 624 to the low side of the loop. This minimizes heat generation in the system. In use, if the engine dies at machine high velocity on flat ground or if the engine dies when the machine travels downhill, the braking energy provides pressurized hydraulic fluid from the high-pressure port B of the motor 612 for emergency steering and/or braking while charging the accumulator(s) 656 at the same time.

An orifice 622 and the relief valve 624 determine how much of the braking power is converted to heat, with the rest being the input power from the pump 604 to the engine if the valve 638 gets stuck in blocking position.

When the machine travels in reverse direction, the solenoid valve 620 is energized and the valve 638 is de-energized. Port B is high pressure and is connected between the pump 604 and the motor 612. Port B is blocked from the accumulator 656 after the accumulator 656 is fully charged to the pressure reducing valve 636 setting.

When the machine accelerates in forward direction, the solenoid valve 620 is energized and the valve 638 is de-energized. Port B is low pressure and it connected between the pump 604 and the motor 612. Port B is blocked from accumulator 656. If the machine does not have sufficient horse power to accelerate, or if acceleration boost is desired, port A pressure drops to below a predetermined value (e.g., 200 bar or any other value), the micro-controller (not shown) receives a signal from the pressure transducer 626 and energizes the solenoid valve 654, the accumulator 656 discharges energy to assist acceleration until it is fully discharged, then the solenoid valve 654 is de-energized.

When the machine is being towed in forward direction, the motor 612 runs as a pump. The high pressure at port B shifts solenoid valves 620 and 638. Port A and port B of the motor 612 is connected when the solenoid valve 654 is manually overridden. The towing is unlimited because the pump 604 is bypassed.

If the accumulator(s) 656 is fully charged before the towing, the steering function can be run to discharge the accumulator(s) 656. The steering is limited because the return hydraulic fluid from the steering is draining out of the loop. It may cause damage to the pump 604 and motor 612 when there is not sufficient hydraulic fluid in the loop. In any case, there typically is not much need for steering during towing and this will not affect the unlimited towing.

It should be appreciated that the accumulator 656, as illustrated in FIGS. 6A and 6B, is shown as being included with a charging system. However, such a configuration is non-limiting. For example, the accumulator could also be provided as a standalone component. Moreover, the accumulator 656 in FIGS. 6A and 6B is illustrated as part of a charging system with one or more fixed pumps. However, this is non-limiting, and it should be understood that the charging system and accumulator could also utilize one or more variable pumps, or a combination of fixed and variable pumps, without departing from the scope of the present disclosure.

It should now be appreciated that, in view of the various non-limiting embodiments discussed above, one or more of the following features may be present in a hydraulic circuit according to the system and method disclosed herein. The exemplary propel systems can be hydrostatic systems or open-circuit systems. The hydrostatic propel systems can be 1×pump and 1×motor, 1×pump and more motors, or any numbers of pumps and motors, and the motor(s) can be fixed, 2-position or proportional. The open-circuit propel system can be 1×pump and 1×motor, 1×pump and more motors, or any numbers of pumps and motors, and the motor(s) can be fixed, 2-position or proportional.

While considerable emphasis has been placed herein on the structures and configurations of the preferred embodiments of the disclosure, it will be appreciated that other embodiments, as well as modifications of the embodiments disclosed herein, can be made without departing from the principles of the disclosure. These and other modifications of the preferred embodiments, as well as other embodiments of the disclosure, will be obvious and suggested to those skilled in the art from the disclosure herein, whereby it is to be distinctly understood that the foregoing descriptive matter is to be interpreted merely as illustrative of the present disclosure and not as a limitation thereof.

What is claimed:

1. A hydraulic circuit comprising:
a pump that is configured to be driven by a prime motor;
a secondary motor fluidly that is coupled to said pump by a supply line and a return line; said secondary motor includes a high-pressure port side;
a fluid output from said secondary motor;
a first work function circuit that is fluidly coupled to said supply line and said return line; said first work function circuit includes a first work function actuator and motor control circuit; said motor control circuit is configured to a) minimize overspeeding of said prime motor, and/or b) assist in acceleration of said secondary motor; said first work function actuator is selected from the group consisting of: a) a fan drive motor, b) a generator motor, c) a cylinder, d) a rotary actuator, e) a work function motor, and f) an actuator motor that is loaded during dynamic motor braking;
a heat control circuit that is configured to reduce heat generation; said heat control circuit includes one or more of a fan pump and said fan drive motor; and
a valving arrangement that is operative to direct at least a portion of pressurized fluid output from said secondary motor during said dynamic motor braking to said heat control circuit to reduce or prevent said prime motor from overspeeding and/or to reduce heat generation in said first work function circuit; said valving arrangement includes a first pressure valve and a second pressure valve; said first and second pressure valves are configured to be activated after a predetermined pressure is sensed; said first and second pressure valves are configured to facilitate in redirecting at least a portion of said pressurized fluid to said heat control circuit when said first and second pressure valves are activated; said valving arrangement includes a first pressure transducer and a pressure reducing valve; said pressure reducing valve includes a preset setting; said pressure reducing valve is configured to allow said pressurized fluid to be directed to a fluid accumulator when said fluid pressure is at said preset setting or exceeds said preset setting; said first pressure transducer is configured to cause at least one of said first and second pressure valves to be activated when said fluid accumulator is charged at a certain level to thereby direct at least a portion of said pressurized fluid to said heat control circuit.

2. The hydraulic circuit as defined in claim 1, wherein said first and second pressure valves are solenoid valves.

3. The hydraulic circuit as defined in claim 1, further comprising a second work function circuit; said second work function circuit includes a braking energy circuit that is configured to control emergency steering and said dynamic motor braking; said braking energy circuit includes one or more of a steering circuit control, a braking circuit control, and a hydraulic valve manifold.

4. A method of controlling a hydraulic drive of a machine; said hydraulic drive includes a) a pump adapted to be driven by a prime motor of said machine, b) a secondary motor that is fluidly coupled to said pump by a supply line and a return line; said secondary motor includes a high-pressure port side, and c) a first work function circuit that is fluidly coupled to said supply line and said return line; said method comprising:
directing at least a portion of a pressurized fluid output from said high-pressure port side of said secondary motor to a heat control circuit;
returning said pressurized fluid back to said high-pressure port side of said secondary motor when said secondary motor is running as a secondary pump;
activating first and second pressure valves after a predetermined pressure is sensed to facilitate in redirecting said pressurized fluid to said heat control circuit; and
A providing a signal from a pressure transducer to activate said first and second pressure valves;
wherein said directing and returning prevents overspeeding in said secondary motor.

5. The method as defined in claim 4, further comprising one or more of:
assisting in accelerating said machine;
permitting unlimited towing of said machine; and
emergency steering and braking of said machine;

wherein one or more of said assisting of said accelerating, said permitting of said unlimited towing, and said emergency steering and braking is at least partially performed by said directing of at least a portion of said pressurized fluid to said first work function circuit.

6. A hydrostatic propulsion system in a machine; said system comprising:
a hydraulic circuit; said hydraulic circuit including:
   a pump that is configured to be driven by a prime motor;
   a secondary motor fluidly that is coupled to said pump by a supply line and a return line; said secondary motor includes a high-pressure port side; said secondary motor is configured to run as a secondary pump;
   a fluid output from said secondary motor;
   a first work function circuit fluidly that is coupled with said supply line and said return line; said first work function circuit includes a prime motor control circuit that is configured to a) minimize overspeeding in said prime motor, b) assist in acceleration, and/or c) permit unlimited towing; said first work function circuit includes i) a first pressure transducer, ii) first and second pressure valves, and iii) a pressure reducing valve; said first and second pressure valves are configured to be activated at a predetermined pressure and to at least partially redirect fluid from said secondary motor to a heat control circuit; said pressure reducing valve includes a preset setting; said pressure reducing valve is configured to allow fluid to be directed to a fluid accumulator when a pressure of said fluid is at said preset setting or exceeds said preset setting; said first pressure transducer is configured to cause at least one of said first and second pressure valves to be activated when said fluid accumulator is charged at a certain level to thereby direct at least a portion of said fluid to said heat control circuit; said heat control circuit is configured to reduce heat generation; said heat control circuit includes one or more of a fan pump and a fan motor, and
a valving arrangement that is operative for directing at least a portion of said fluid output from said secondary motor during braking operations to said heat control circuit.

7. The system as defined in claim 6, wherein said heat control circuit further includes a solenoid valve, a check valve and a multi-way valve.

* * * * *